Sept. 6, 1949. T. I. ELDRIDGE, JR 2,481,298
ELECTRICAL DISCONNECTOR
Filed July 19, 1944 2 Sheets-Sheet 1
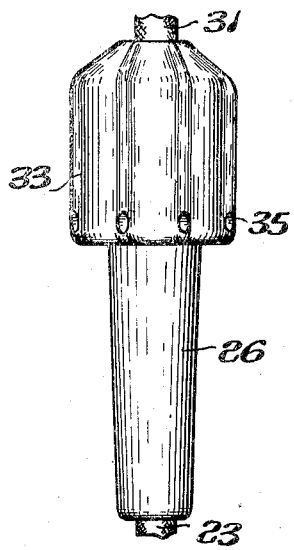
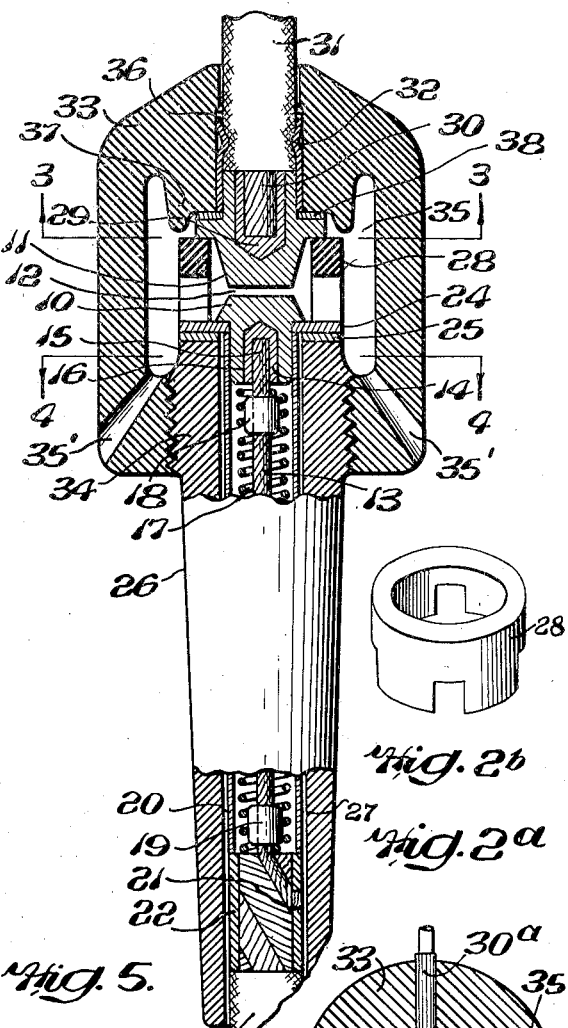
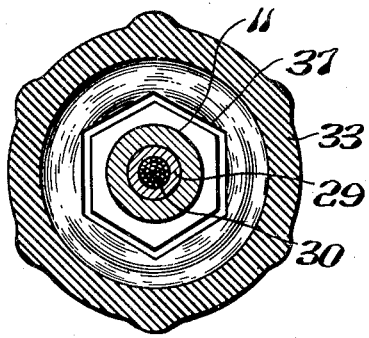
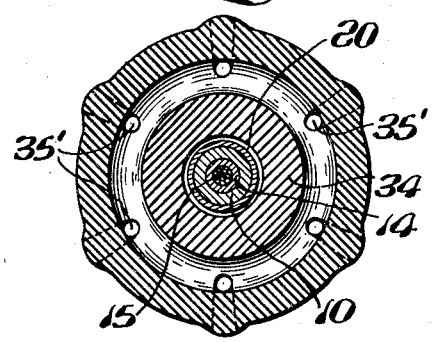
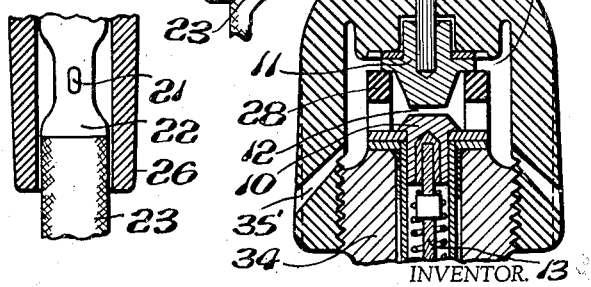
INVENTOR.
TAUSIAS IRVEN ELDRIDGE, JR.
BY
ATTORNEY.

Sept. 6, 1949.                    T. I. ELDRIDGE, JR                    2,481,298
                                  ELECTRICAL DISCONNECTOR
Filed July 19, 1944                                                   2 Sheets-Sheet 2
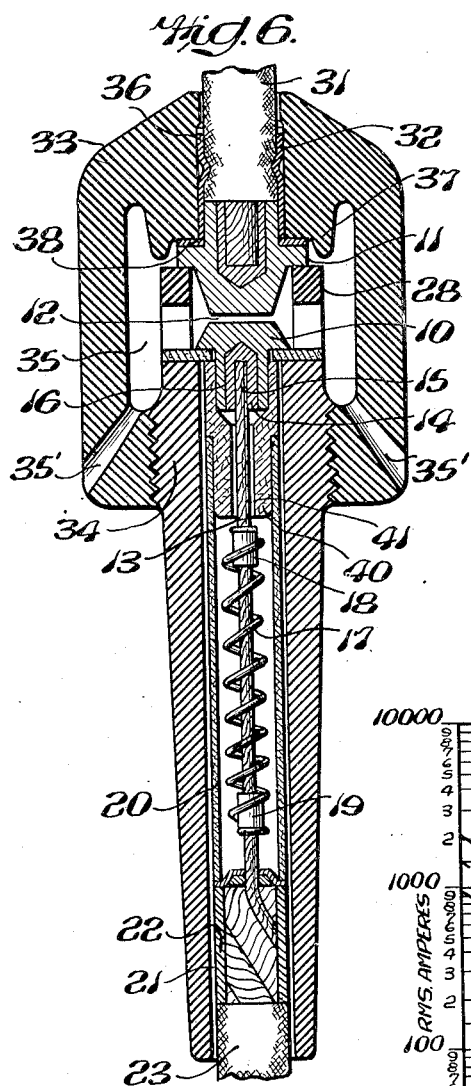
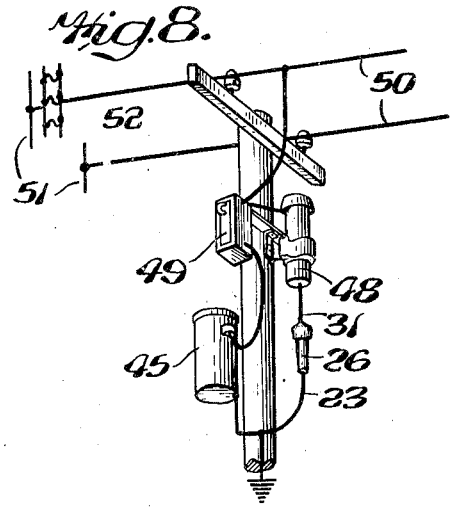
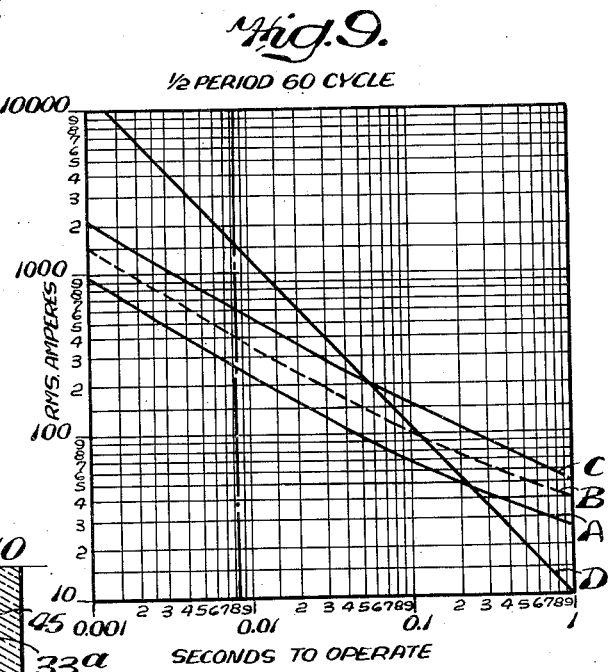
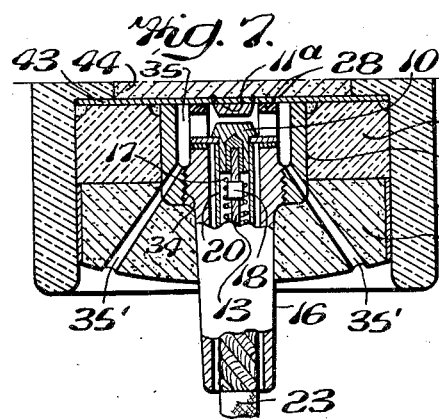
INVENTOR.
TAUSIAS IRVEN ELDRIDGE, JR.
BY
ATTORNEY.

Patented Sept. 6, 1949

2,481,298

UNITED STATES PATENT OFFICE 2,481,298

ELECTRICAL DISCONNECTOR

Tausias Irven Eldridge, Jr., Brookline, Pa., assignor to Electric Service Manufacturing Company, Philadelphia, Pa., a corporation of Pennsylvania Application July 19, 1944, Serial No. 545,645

2 Claims. (Cl. 200—115)

My invention is a circuit interrupter or electrical disconnector which permits substantially unimpeded discharge of surge currents therethrough to ground but which is disrupted by flows of dynamic current to ground, such as sometimes occur upon the failure of a lightning arrester connected in series with the disconnector, and particularly by such flows as are insufficient to effect the instantaneous operation of a current-responsive circuit-protective cut-out or to blow up an arrester.

It is a primary object of my invention to effectively interrupt such minor flows of dynamic current before the circuit-protective cut-out is operated thereby and to provide a visual indication that the complementary lightning arrester has not prevented such dynamic current flow and has been disconnected from ground by the action of the disconnector.

The current-responsive circuit-protective cut-outs used for protection of electrical circuits and current operable equipment, such as transformers, rectifiers and dynamo electric machines, generally include one or more fuses or circuit breakers having a time delay or lag inversely proportional to the current required to operate or "blow" them, and, generally speaking, the amperage rating of such fuses or circuit breakers is inversely proportional to the normal rated voltage of the transmission or distribution circuit designed to be protected thereby, assuming the energy transmitted at the several voltages is comparable. Lightning arresters are generally connected to the circuit and are designed to discharge surge currents and interrupt the flow of dynamic or system current along the path established by the surge current before the cut-out is operated. It sometimes happens, however, that a lightning arrester becomes defective in service and fails to immediately interrupt the flow of follow current. If such flow or dynamic follow current is sufficiently great, it heats and blows up the arrester, thereby clearing the line. Frequently, however, the flow is insufficient to thus clear the line, but may be of sufficient magnitude to quickly blow the cut-out fuse or circuit breaker, or the magnitude of such dynamic follow current may be below the rated capacity of the cut-out fuse or circuit breaker. In the latter case the flow of dynamic follow current is indefinitely prolonged, with consequent radio interference, decrease in system voltage and other objectionable operational characteristics.

My invention provides means for interrupting flow to ground of dynamic follow current having a magnitude insufficient to blow up an arrester and below that causing substantially instantaneous operation of the circuit protective cut-out, but which, within its operating field, will interrupt a flow to ground before such flow causes the operation of the cut-out or appreciable electrical disturbance.

My disconnector is characterized by a longer lag or time delay, for current flows of relatively high magnitude, than the cut-out used in conjunction therewith, but has a shorter lag or time delay, for current flows of lesser magnitude, than the same cut-out. In other words, the time lag of my disconnector does not decrease as rapidly with increases in current magnitude as the time lag of the cut-out decreases with corresponding increases in current magnitude. A disconnector may be provided having a lag equal to the lag of the cut-out used in conjunction therewith at any desired current magnitude. The point of equality of lags may be dependent on operating conditions or the predilections of the operator, but generally the lag of the disconnector will be greater than the lag of the cut-out for all current magnitudes causing operation of the latter within, say, a half cycle, but the lag of the disconnector is preferably less than the lag of the cut-out for current magnitudes substantially less than the maximum R. M. S. amperes likely to flow through cut-out and disconnector on a full short to ground.

In accordance with my invention, the interrupting function of my disconnector is accomplished by the mechanical displacement of a conducting element a limited distance from a complementary conducting element and rapidly extending the arc between such parting elements into close proximity to and over a long length of gas-generating material preferably forming a constricted arc slot in which the turbulence of the deionizing gas is augmented by the movement of the parting element. The substantially concurrent voluminous generation and agitation of deionizing gas extinguishes the arc between the conducting elements without the necessity of parting them the maximum distance across which an arc would be normally maintained by current of the magnitude flowing or moving such arc into dangerous proximity with other objects.

My disconnector is devoid of inductive resistance tending to impede the discharge of surge currents to ground, and is not operable by such surge current discharges or by dynamic discharges of sufficient magnitude to operate the circuit-protective cut-out within a half cycle.

My invention utilizes the heat generated by an arc maintained by follow current flowing to ground and which heat is conducted to and concentrated upon thermally responsive means which liberates and permits the ejection of a non-inductive conductor through a passage having a wall activated by heat to generate or liberate deionizing gas. The concentration of the arc-generated heat is preferably effected by forming one of the arc electrodes of a substance of greater thermal conductivity than the other arc electrode and interposing the thermally responsive means between the electrode of high thermal conductivity and a ground conductor element of lower thermal conductivity. By thus augmenting the conductance of heat to the thermally responsive means and retarding the conductance of heat therefrom through the ground element or other arc electrode, the time lag of the disconnector can be controlled and correlated to the lag of a cut-out fuse or circuit breaker, whose lag is generally dependent on other factors than the rate of thermal conductance.

The thermally responsive means preferably consists of a fusible material of relatively low melting point and normally bonding together conducting elements in the discharge path to ground of the arrester. One of the bonded elements is normally biased by a spring maintained under tension by a tubular spacer forming the passage having a deionizing gas generating wall through which the biased element is ejected by the spring upon its release by the fusible bonding material.

The arc gap electrodes of the disconnector are preferably spaced by a slotted spacer preventing accumulation of moisture between the electrodes, which are preferably housed in a vented housing provided with outwardly flared ports for the discharge of moisture accumulating on the slotted spacers or within the housing and for the relief of pressure generated by the arc.

The characteristic features and advantages of my improvements will further appear from the following description and the accompanying drawings in illustration thereof.

In the drawings, Fig. 1 is an elevation of one form of a circuit interrupter embodying my invention; Fig. 2 is an enlarged view of the interrupter shown in Fig. 1, with parts broken away to show the inner construction; Fig. 2a is a broken fragmentary view illustrating a modification of the upper parts of the disconnector shown in Fig. 2; Fig. 2b is a perspective view of a separator between the electrodes; Fig. 3 is a transverse sectional view taken on the line 3—3 of Fig. 2; Fig. 4 is a transverse sectional view taken on the line 4—4 of Fig. 2; Fig. 5 is a fragmentary part sectional view illustrating the attachment of a ground cable to the interrupter; Fig. 6 is an enlarged longitudinal sectional view showing the incorporation of supplementary arc extinguishing means in the interrupter illustrated in Figs. 1 to 5; Fig. 7 is a fragmentary sectional view illustrating the embodiment of a disconnector embodying my invention integrally in a lightning arrester; Fig. 8 is a diagrammatic layout of a transformer and protective installation embodying my improved interrupter coordinated with a lightning arrester and circuit cut-out; and Fig. 9 is a graphic chart illustrating the relationship of certain operating characteristics of an interrupter embodying my invention with circuit cut-out fuses which may be coordinated therewith.

As illustrated in Figs. 1 to 6 of the drawings, my invention comprises a pair of complementary arc electrodes 10 and 11 each having a hollow shank, a conoidal head and a supporting flange adjacent to the juncture between the shank and the head. The electrodes 10 and 11 have arcing faces axially spaced from one another to form an arc gap 12 and are composed of substances of substantially different specific thermal conductivity but of low electrical resistivity. For instance, the electrode 10 may be composed of substantially pure copper, having a thermal conductivity of the order of, say, .858 to 1.097, and the electrode 11 may be composed of brass having a thermal conductivity of the order of, say, .181 to .246. Or the electrode 10 might, for instance, be composed of silver having a thermal conductivity of the order of, say, .998 to 1.006 and the electrode 11 might be made of German silver having a specific conductivity of the order of, say, .070 to .10. Any other suitable substances of relatively low electrical resistivity and widely divergent specific thermal conductivities may be used.

The electrode 10, composed of the substance of greater specific thermal conductivity, has a flexible non-inductance conductor 13 connected therewith through thermally responsive means, such as the low melting point solder 14, which bonds the end 15 of the conductor 13 in the socket 16 of the electrode 10. The conductor 13 is preferably made of a metal of lower thermal conductivity than the electrode 10.

The conductor 13 is subjected to tension, tending to bias its end 15 away from the electrode 10, by a tension spring 17 coiled around the conductor 13 and having its ends anchored to collars 18 and 19 firmly secured on the conductor 13. The collars 18 and 19 are so spaced from one another axially along the conductor 13 that the spring 17 is tensioned when the conductor 13 is straightened, and the end 15 is drawn downward by the spring 17 when released from the bonding material 14.

The spring 17 is maintained under desired tension by securing the outer end of the conductor 13 relative to a tubular fibre spacer 20, which, as shown in Fig. 2, may be secured on the depending stem of the electrode 10 and encloses the conductor 13 and spring 17. The conductor 13 may be made fast relative to the tube 20 in any suitable manner, as, for instance, by drawing the conductor 13 through an aperture 21 in a collar 22 and swaging or crimping a section of the collar 22 against the insulation of a conducting cable 23 having its conducting core electrically connected with the conductor 13 either directly or through the conducting collar 22.

The stem of the electrode 10 is encircled by, and the flanged head of the electrode 10 rests on, an insulating washer 24 (such as Bakelite linen) supported by an elastic insulating washer 25 (such as Duprene) mounted on a hollow insulating stem 26 containing a bore 27 in which the fibre tube 20 and a portion of the cable 23 are housed.

An annular slotted spacer 28 rests on the washer 24 and provides a support for the polygonal flange of the electrode 11. The spacer 28 is of the requisite height to maintain the arcing face of the electrode 11 a desired predetermined distance from the arcing face of the electrode 10.

As illustrated in Figs. 2 and 3, the electrode 11 may be bonded by solder 29 (preferably of higher melting point than the solder 14) to the end 30 of the conducting core of an insulated cable 31; the cable being secured to the electrode 11 by a tube 32 sleeved on the stem of the electrode 11 and crimped on the cable 31.

Preferably, however, I avoid using solder for connecting the top terminal 11 with the line cable 31 and connect such terminal by a press fit, with a serrated copper rod 30a, as shown in Fig. 2a.

A cap or hollow housing member 33 is screwed onto the threaded shoulder 34 of the hollow stem or housing member 26 so that the upper portion of the stem 26 projects into an expansion chamber 35 in the housing 33. Any pressure developed by arcing in the chamber 35 is relieved, and such chamber is ventilated and drained, by the diagonal conoidal passages 35″ in the bottom of the cap 33.

As shown in Figs. 2 and 6, the top of the cap 33 may contain a bore 36 for the passage of the cable 31 and sleeve 32, or as shown in Fig. 2a the rod 30a may make a close press fit with an aperture through the cap 33.

The cap 33 is provided with a flanged depending boss 37 having a radial face resting on an elastic insulating gasket 38, suitably of Duprene, mounted on the flange of the electrode 11 and surrounded by a polygonal rim of the boss 37.

The spacer 28 and the housing members 26 and 33 are preferably made from a moldable, solidifiable, insulating material, such, for instance, as fibre or steatite for the spacer 28, and Bakelite, porcelain or glass for the housing members 26 and 33.

The parts entering into my disconnector may be assembled and stocked as sub-assemblies ready for incorporation in a complete disconnector or as replacements in a used disconnector. For instance, the collars 18 and 19 may be fixed in properly spaced relation on a suitable length of stranded conducting wire 13 and the spring 17 secured thereto. The end 15 is then bonded in an electrode 10 by a low melting point solder 14. A washer is placed on the shank of the electrode 10 and the shank is secured in a cylindrical tube 20, which may be made from gas generating stock, such as hard fibre, or may be impregnated with gas generating material, such as borax. The spring 17 is then expanded by drawing the conductor 13 through the aperture 21 of the metallic ferrule 22 on the cable 23; the parts being retained in assembled relation by crimping or swaging the ferrule 22.

Such a sub-assembly can be quickly slipped into a washer 25 and housing section 26. Similarly the upper electrode may be made into a sub-assembly with the cable 31 and sleeve 32 or with the rod 30a and slipped into the housing section 33.

The final assembly merely involves screwing together the housing sections with the sub-assemblies therein and a spacer 28 between them; the spacer being preferably made of gas generating fibre. Any moisture or condensate tending to collect accumulates on the slotted spacer or housing wall and is discharged downwardly and outwardly through the ports 35′.

The electrical leakage distance along the surfaces of the housing is more than five times that across the steatite spacer; both such leakage paths being in series with the electrodes but in shunt with one another.

In the modified interrupter shown in Fig. 6 there is interposed between the bond 14 and the collar 18 on the flexible conductor 13 a tubular plug 40 having one end telescoped on the shank of the electrode 10 and the other end telescoped within the fibre tube 20. The plug 40 contains an axial passage 41 only slightly larger in diameter than the diameter of the conductor 13 and of sufficient length to form a slot having arc suppressive characteristics. The clearance between the conductor 13 and wall of the passage 41 is exaggerated in the drawings for the sake of clearness but should be as small as possible without interferring with the movement of the conductor through the passage. The plug is preferably composed of or contains a gas generating substance, such as hard fibre or boric acid, which is activated by an arc to generate deionizing gases tending to extinguish an arc.

In the embodiment of my invention illustrated in Fig. 7, my improvements form an integral part of lightning arrester 42, of the arc gap and characteristic element type shown in Letters Patent No. 1,763,667, but it will, of course, be understood that my invention may be incorporated in or used with other types of arresters, such, for instance, as expulsion gap arresters.

In this embodiment of my invention, the arrester's bottom electrode 43, which supports the characteristic element 44, has formed on or secured to the bottom thereof a conoidal arc electrode 11a surrounded by a housing section 33a secured in place by cement 45. A spacer 28 and a sub-assembly, including parts 10 to 26 inclusive, such as hereinbefore described, are inserted in the housing section 33a in complementary relation to the electrode 11a, and, if desired, may be partly embedded in an apertured layer of cement 46.

As shown, somewhat diagrammatically, in Fig. 8, a circuit interrupter, such as shown in Figs. 1 to 6, has its gap electrode 10 connected with ground through the conducting cable 23. The gap electrode 11 of the interrupter is connected in series, through a conductor 31, with the lightning arrester 48, preferably of the arc gap and characteristic element type, such as illustrated in the McFarlin Patent No. 1,763,667. The transformer has its primary winding connected through a fused cut-out 49 with a branch distribution circuit 50 with which the line electrode of the arrester is also connected. The branch circuit is connected with a main feeder circuit 51 through a usual cut-out 52, preferably of the multi-shot fuse type having a time lag coordinated with the system voltage and with the disconnector. The cut-out may be of any usual or desired type, and preferably its multiple fuses are automatically placed in service one after another as such fuses are blown.

Fuses used in cut-outs protecting branch or spur circuits generally have substantially standardized ampere-time characteristics resulting in predetermined time delays or lags relative to currents of various magnitudes. The approximate operating characteristics of standard 5, 7 and 10 ampere fuses are indicated by the lines A, B and C in the graph, Fig. 9, in which the abscissa indicata R. M. S. amperes and the ordinates indicate fractions of seconds required to blow a fuse at various current magnitudes.

The ampere-time characteristic of a disconnector embodying my invention is indicated by the line D.

Circuit protective cut-outs having standard fuses of 5, 7, or 10 ampere ratings are suitable and commonly used for branch circuit protection where the maximum short circuit current to be anticipated is of the order of 100 R. M. S. amperes.

From the graph (Fig. 9) it will be noted that a five ampere standard fuse will blow in approximately 0.045 second under the foregoing short circuit conditions, a seven ampere fuse will blow in approximately 0.10 second under the foregoing short circuit conditions, and a standard ten ampere fuse will blow in approximately 0.25 second under the foregoing short circuit conditions. Under the same short circuit conditions, a disconnector embodying my invention and having the characteristics indicated by the line D will interrupt a follow current flow to ground in approximately 0.10 second.

Commonly circuit protective cut-outs embody what are known as three-shot fuses, and on the failure of the first fuse automatically reclose the circuit and bring the second fuse into action, and on failure of the second fuse automatically reclose the circuit and bring the third fuse into action. If a branch circuit such as above described were protected by a cut-out having three shot five ampere fuses, upon a maximum short to ground following an arrester failure, the first fuse would blow and the disconnector would interrupt the flow to ground as the second fuse comes into circuit and generally before the second fuse is blown, although under some circuit conditions the second five ampere fuse may blow concurrently with the action of the disconnector. Even in the latter event the flow to ground will be interrupted by the disconnector before the third fuse comes into circuit and the circuit will be re-energized thereby and an outage avoided. If the flow of follow current to ground following an arrester failure is of a magnitude of say 40 R. M. S. amperes or less, the disconnector will interrupt such flow to ground before even the first of the five ampere fuses is blown and if the short is of a magnitude of less than five amperes the disconnector will operate before any harm has been done by the short.

If the same circuit were protected by a cut-out fused with three shot seven ampere fuses, a maximum short following an arrester failure would result in the substantially simultaneous blowing of the first fuse and the interruption of the follow current by the operation of the disconnector, and the second of the seven ampere fuses would close and permit the re-energizing of the circuit, which will have been cleared of the defective arrester by the operation of the disconnector. If the magnitude of the flow to ground were less than a maximum short, the disconnector would have removed the defective arrester from the circuit before the blowing of the first fuse.

If the same circuit were protected by a cut-out having three shot ten ampere fuses, a maximum short to ground through a defective arrester would have been interrupted by the disconnector before any of the fuses had blown.

But in any case, upon the occurrence of an abnormal short of such magnitude as would have blown a fuse within a half cycle, the fuses would all have been blown or the arrester exploded before the operation of the disconnector.

The foregoing characteristics are provided by co-relating the fusion temperature of the bond 14 and the rate of heat transfer from the arc in the gap 12 to the time-ampere characteristics of the fuses of the cut-out 52.

Generally it is desirable to use for the bond 14 an alloy having a melting point between, say, 150° F. and 500° F. An alloy of approximately 50% tin, 32% lead and 18% cadmium having a melting point of about 300° F. is generally suitable for use with a pure copper arc electrode in a disconnector for distribution circuits operating at voltages and amperages, such as above described.

On discharges to ground of momentary surge currents, such as lightning, the disconnector interposes no substantial impedance since its surge capacity is preferably greater than that of the arrester and the time interval is too brief for the conductance of sufficient heat to the bond 14 to effect its fusion, even though such time interval should be sufficient to blow the fuses of the cut-out 52.

But when the heat of the arc is transmitted to and concentrated upon the bond 14 for an interval sufficient for its fusion or softening, the ground element 13 is released from the bond and rapidly retracted by the contraction of the spring 17. The arc between the end 15 and electrode 10 generates deionizing gases from the wall of the tube 20 and such gases extinguish the arc generally before the cable 23, collar 22 and conductor 13 fall from the housing 26. The dangling position of the cable 23, collar 22 and conductor 13 indicates that the arrester has failed and should be replaced.

The disconnectors shown in Figs. 1 to 6 may be restored to condition for use by unscrewing the housing section 26 from the housing section 33 and installing a new sub-assembly of parts 10 to 23 or by rebonding the end 15 in the socket 16.

Having described my invention, I claim:

1. An electrical disconnector comprising an insulating hollow shell having a gap electrode seated in one end thereof, an insulating hollow stem secured to said shell and having an end projecting into said shell, a gap electrode mounted on said end, a slotted spacer between said electrodes and limiting the movement of said stem relatively to said shell, and a thermally responsive device housed in said stem and fusible by the conduction of heat through the second named electrode from an arc between the electrodes to interrupt such arc.

2. An electrical disconnector comprising a vented insulating hollow shell containing a flanged apertured boss projecting from a wall thereof, a gap electrode seated on said boss, a conductor connected with said electrode and projecting through the aperture of said boss, an insulating hollow stem secured to said shell and having an end projecting into said shell beyond the mouths of said vents, a gap electrode mounted on said projecting end, a slotted spacer between said gap electrodes, a gas-generating substance within said hollow stem, a conductor in said stem, a fusible connection between said second named electrode and conductor.

TAUSIAS IRVEN ELDRIDGE, Jr.

REFERENCES CITED

The following references are of record in the file of this patent:

UNITED STATES PATENTS

| Number | Name | Date |
|---|---|---|
| 446,966 | Field | Feb. 24, 1891 |
| 1,159,936 | Harris | Nov. 9, 1915 |
| 1,873,499 | Steinmayer | Aug. 23, 1932 |
| 1,937,166 | Pittman | Nov. 28, 1933 |
| 2,152,864 | Boothe | Apr. 4, 1939 |
| 2,170,337 | Pittman et al. | Aug. 22, 1939 |
| 2,174,477 | Pittman et al. | Sept. 26, 1939 |
| 2,286,534 | Goldner | June 16, 1942 |
| 2,305,436 | McMorris | Dec. 15, 1942 |
| 2,315,320 | Earle | Mar. 30, 1943 |
| 2,374,560 | Nelson | Apr. 24, 1945 |
| 2,418,017 | Ellicock | Mar. 25, 1947 |